United States Patent [19]
Kasugai et al.

[11] Patent Number: 4,666,056
[45] Date of Patent: May 19, 1987

[54] CAP WITH VALVE

[75] Inventors: Joji Kasugai, Ichinomiya; Masami Yamamoto, Toyota, both of Japan

[73] Assignees: Toyoda Gosei Co., Ltd.; Toyota Jidosha Co., Ltd., both of Toyota, Japan

[21] Appl. No.: 855,631

[22] Filed: Apr. 25, 1986

[30] Foreign Application Priority Data

Apr. 27, 1985 [JP] Japan ................ 60-064134

[51] Int. Cl.$^4$ ............................................. B65D 51/16
[52] U.S. Cl. ............................................. 220/203
[58] Field of Search ............ 220/203, 303, DIG. 32, 220/DIG. 33, 206, 204; 137/315, 493, 493.9

[56] References Cited

U.S. PATENT DOCUMENTS

| 4,079,855 | 3/1978 | Avrea ................ 220/203 |
| 4,498,493 | 2/1985 | Harris ............... 220/203 |
| 4,498,599 | 2/1985 | Avrea ................ 220/203 |
| 4,540,103 | 9/1985 | Kasugai et al. ...... 220/203 |
| 4,588,102 | 5/1986 | Kasugai ............. 220/203 |

Primary Examiner—George T. Hall
Attorney, Agent, or Firm—Cushman, Darby & Cushman

[57] ABSTRACT

A cap with valve of the invention is provided with a negative pressure valve at a fluid entering flow path in a closure installed to an aperture of a container, so that fluid flows into the container from outside when pressure in the container is decreased, thereby decrease of the pressure in the container is prevented. A filter cloth is arranged to the fluid entering flow path at the front side of the negative pressure valve and swells to the fluid entering side so as to cover the flow path.

3 Claims, 4 Drawing Figures

CAP WITH VALVE

BACKGROUND OF THE INVENTION

The present invention relates to a cap with negative pressure valve, such as a fuel cap for automobiles, which is installed to an aperture of a container such as a filler neck of a fuel tank and prevents decrease of pressure in the container such as the fuel tank by flowing fluid such as air into the container from outside when the pressure in the container is decreased.

In the prior art, such cap, for example, a fuel cap for automobiles is provided with a negative pressure valve which enables flowing of air into a fuel tank so as to prevent decrease of pressure within the fuel tank.

In such cap, when the valve acts, fluid such as air inevitably passes through the valve body on account of its function. If dust is mixed in the fluid, it is liable to adhere to the valve body. In order to avoid this state, one method is that a filter cloth to cover the fluid entering flow path is arranged in the flow path at front side of the negative pressure valve. In this case, however, if the filter cloth is arranged in the fluid entering flow path so as to cover the flow path simply in plane state in orthogonal direction to the fluid entering direction, the fluid flows in and dust adheres to the filter cloth, and then even if entering of the fluid is stopped the dust may remain positioned on the filter cloth. If the dust further adheres in this state it may finally adhere throughout whole surface of the filter cloth and the fluid entering flow path be narrowed.

SUMMARY OF THE INVENTION

An object of the invention is to provide a cap with negative pressure valve wherein a filter cloth is arranged to prevent adhering of dust or the like to the negative pressure valve, and even if dust adheres to the filler cloth at acting state, the dust in adhesion is separated from the filter cloth when entering of the fluid is stopped, thereby possibility of narrowing the fluid entering flow path is reduced.

The above object is attained in a cap with negative pressure valve which is installed to an aperture of a container and prevents decrease of pressure within the container by flowing fluid into the container from outside when the pressure within the container is decreased, wherein a filter cloth is arranged in a fluid entering flow path at front side of the negative pressure valve in the cap and swells to fluid entering side so as to cover the flow path.

DESCRIPTION OF THE PREFFERED EMBODIMENTS

Figure 1:
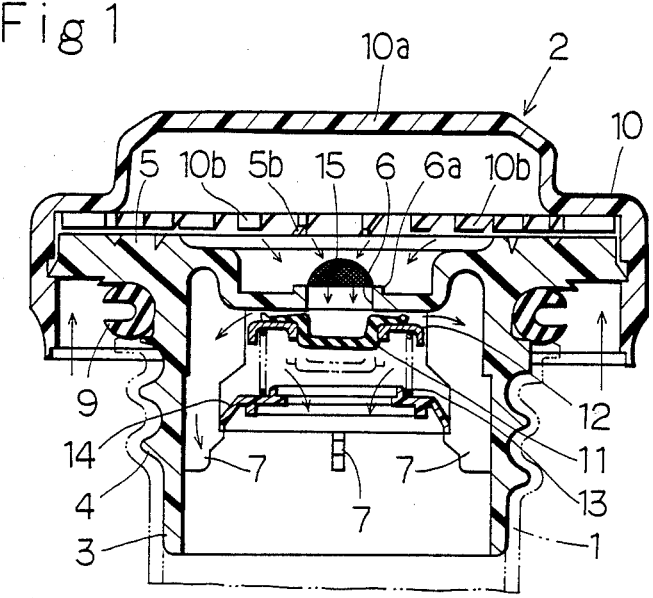
FIG. 1 is a sectional view of a fuel cap as a first embodiment of the invention.
Figure 2:
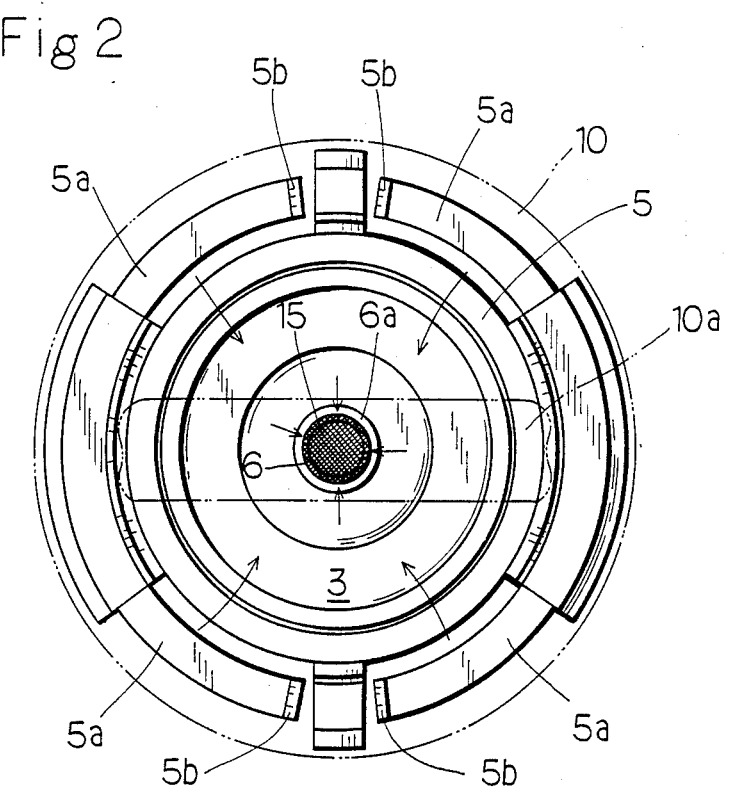
FIG. 2 is a plan view of a closure in the first embodiment.

A cap as a first embodiment shown in FIGS. 1 and 2 is a fuel cap 2 to be threadably engaged with a filler neck 1 opened for supplying fuel to a fuel tank.

The fuel cap 2 is composed of a closure 3 made of plastic material such as polyacetal in cylindrical form, and a shell 10 made of plastic material such as nylon in disk-like form and installed on upper side of the closure 3.

A thread 4 corresponding to the filler neck 1 is provided on outer circumference of the closure 3, and a seal ring 9 is installed on outside of upper end of the thread 4, and further a flange 5 is formed to make the seal ring 9 abut on lower surface. The flange 5 is provided at top end with a pawl 5b projecting upward, and a prescribed number of resilient fingers 5a being deformable in the axial direction of the closure 3.

The shell 10 is installed in snap action to outer circumference of the flange 5 of the closure 3 and provided with a grasping portion 10a on upper side. A plurality of ratchet projections 10b being engageable with the pawl 5b of the resilient finger 5a are formed on rear surface of the upper side of the shell 10. In order to prevent overtightening of the fuel cap 2, the ratchet projection 10b and the pawl 5b are provided so that when the shell 10 is subjected to torque over prescribed valve in one direction (rotational direction in which the fuel cap 2 is threadably engaged with the filler neck 1) it races with respect to the closure 3 and when torque is applied in reverse direction (rotational direction in which the fuel cap 2 is detached from the filler neck 1) the shell 10 does not race with respect to the closure 3.

A spring support plate 14 is held to inner circumference of the closure 3 by a plurality of support projections 7 formed at prescribed position, and a valve support plate 12 is arranged above the spring support plate 14 and a coil spring 13 to give upward bias is interposed between the valve support plate 12 and the spring support plate 14. A valve body 11 of rubber held by the valve support plate 12 abuts on lower periphery of an air hole 6 bored on upper side of the closure 3 so that the air hole 6 can be covered.

Figure 3:
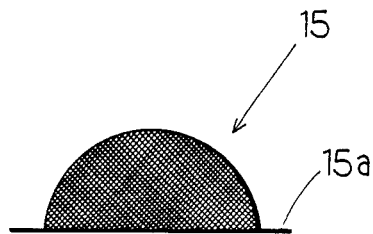
FIG. 3 is a side view of a filter cloth used in the first embodiment.

An annular projection 6a is formed on upper periphery of the air hole 6, and a flange 15a is heat-welded to end surface of the projection 6a thereby a filter cloth 15 of cup-like form is fixed so as to cover the air hole 6 (refer to FIG. 3). The filter cloth 15 is made in that wire rod of about 0.1 mm in diameter of copper, brass, aluminium or the like having fuel oil resistant property is woven in 100~200 meshes. The filter cloth 15 is arranged with the swelling of cup-like form directed upward.

If the fuel cap 2 is installed to the filler neck 1 and then pressure within the fuel tank is decreased to that less than the atmospheric pressure by prescribed pressure, the valve body 11 and the valve support plate 12 are lowered. Air flows from lower surface of outer periphery of the shell 10 and through space between the resilient finger 5a and the flange 5 and then passes through the air hole 6 and enters the filler neck 1 so as to eliminate the negative pressure state within the fuel tank. In this case, since the filter cloth 15 covers the air hole 6 being an air entering flow path at front side of the valve body 11, dust mixed in the air adheres to the filter cloth 15 thereby the clean air enters the fuel tank. If the negative pressure state within the fuel tank is eliminated afterwards, the air entering is stopped and the dust in adhesion to the filter cloth 15 by means of the air entering force slips off the adhesion position on the filter cloth 15 because the filter cloth 15 is formed in curved surface with upper side swelling. The dust slipping off the filter cloth 15 falls on circumference of the bottom end of the filter colth 15 so that there is no fear of narrowing of the air entering flow path by dust.

The fixing method of the filter cloth 15 in the embodiment is the heat welding of the flange 15a at circumference of the filter cloth 15 with end surface of the projection 6a on periphery of the air hole 6, and therefore can be performed simply at low cost.

Figure 4:
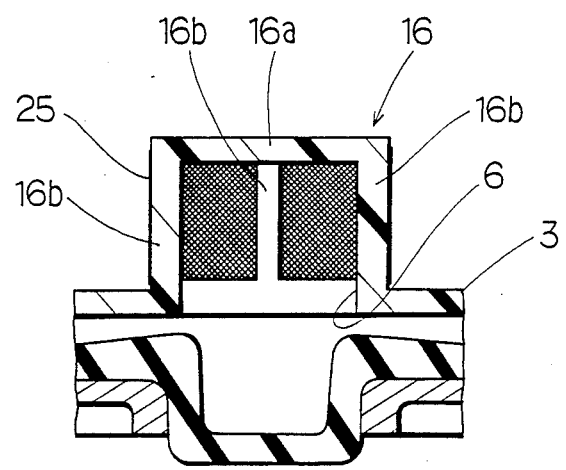
FIG. 4 is a sectional view illustrating configuration of a filter cloth as a second embodiment.

In the first embodiment shown in FIGS. 1 and 2, the metal wire rod woven in cup-like form is used as the filter cloth 15 which is arranged on the air hole 6. However, in a second embodiment shown in FIG. 4, a plurality of stays 16b are vertically arranged in circular arc form on upper periphery of the air hole 6, a ceiling plate 16a of disc form is installed on upper side of the stays 16b, and a frame 16 is formed integrally with the closure 3. A filter cloth 25 is made of chemical fiber with fuel oil resistant property woven in 100~300 meshes, and fixed in cylindrical form onto outside lateral surface of the stays 16b. A cap in this constitution has similar effect to that of the cap 2 shown in FIG. 1.

What is claimed is:

1. A cap with valve comprising:
   (a) a closure installed to an aperture of a container;
   (b) a fluid entering flow path formed in the closure;
   (c) a negative pressure valve arranged in the fluid entering flow path for flowing the fluid into the container from outside when pressure in the container is decreased so as to prevent the decrease of the pressure in the container; and
   (d) a filter cloth arragned at the fluid entering flow path and swelling to the fluid entering side so as to cover the flow path.

2. A cap with valve as set forth in claim 1, wherein said filter cloth is made of metal wire rod being woven.

3. A cap with valve as set forth in claim 1, wherein said filter cloth is made of chemical fiber being woven.

* * * * *